3,340,930
OIL RECOVERY PROCESS USING AQUEOUS MICROBIOLOGICAL DRIVE FLUIDS

Donald O. Hitzman, Bartlesville, Okla., assignor to Phillips Petroleum Company, a corporation of Delaware
No Drawing. Filed Aug. 16, 1965, Ser. No. 480,109
15 Claims. (Cl. 166—9)

This invention relates to a process for recovering oil from a stratum containing same by aqueous fluid drive.

The desirability of recovering residual oil by low temperature processes requiring little energy has led to the development of numerous secondary recovery processes. None of these will recover all the oil-in-place and in many cases these processes are not effective at all so that high temperature processes may be required. It has also been suggested that certain microorganisms be injected into a formation to consume certain constituents of the crude, such as sulfur compounds or to convert higher molecular weight hydrocarbons into lower molecular weight hydrocarbons to reduce viscosity of crudes or to solubilize oil shale kerogen.

It has also been suggested in application Ser. No. 449,307, filed Apr. 19, 1965, to inject dead oleophilic microorganisms with adsorbed surfactants into a formation to stimulate production.

This invention is concerned with a process for stimulating oil production with improved recovery of oil by aqueous fluid drive.

Accordingly, it is an object of the invention to provide a process for the recovery of oil from an oil-bearing stratum by aqueous fluid drive. Another object is to provide such a process utilizing a waste product from a conventional oil improvement process in the petroleum industry. A further object is to provide such a process which utilizes live microorganisms, including yeast and bacteria, to dislodge and upgrade the oil in situ. It is also an object of the invention to provide a more economical process for producing oil utilizing live microorganisms. Other objects of the invention will become apparent to one skilled in the art upon consideration of the accompanying disclosure.

A broad aspect of the invention comprises injecting into an oil-bearing stratum a slug of a by-product of an oil fermentation process containing oil, water, salts, and live microorganisms of yeast, bacteria, or mixtures thereof, said microorganisms being hydrocarbon consuming; thereafter, injecting an aqueous driving fluid behind the slug so as to drive the slug through the startum to a production well and displace hydrocarbons from the stratum while upgrading same; and recovering the produced hydrocarbons from the production well. The slug material is preferably a by-product of a dewaxing process utilizing yeast and/or bacteria which have the capacity to consume paraffinic hydrocarbons in the oil, but may also be obtained from other oil fermentation processes. In such a process, there is a residual aqueous phase containing live cells in the range of about 0.5 to 2 or more weight percent on dry basis of the total cells in the reaction mixture. The aqueous slug also contains surface active materials produced during the metabolistic action. The live cells are surrounded by oil which is difficult to separate therefrom. A substantial portion of the salt content of the dewaxing mixture is also found in the aqueous phase by-product which is normally discarded. It is this residual aqueous phase which is injected into the stratum containing oil together with an added amount of suitable surfactant in the range of about 0.05 to 1.0 weight percent of the slug when desired, for effecting further growth of cells or microorganisms in situ and fermentation or metabolistic action on the in-place oil to improve oil production.

It is preferred to allow a substantial period of cell growth after injecting the aqueous slug containing microorganisms before driving the slug deeper into the stratum to the production well(s) with the aqueous driving fluid. This growth period may be in the range of about 5 to 48 hours or longer, if desired. The driving fluid comprises saline water recovered from a stratum containing the same or prepared by addition of salts thereto. Untreated surface water is also suitable driving fluid or flooding agent.

The injected cells pass through the formation and by the dual mechanism of microbial or metabolistic action and the action of the preformed and/or added surface active agents in the spent fermentation medium cause increased oil to be displaced from the stratum. The cells continue to grow in the startum and by their physical presence and their products of metabolism through multiplication cause additional oil release and upgrading of the oil.

Live bacteria, all of which are non-pathogenic, which may be used in the process of the invention are listed below:

Members of class: Schizomycetes
    Order I. Eubacteriales
        Suborder I. Eubacteriineae
            Family I. Nitrobacteriaceae
            Family II. Pseudomonadaceae
                Tribe 1. Pseudomonadeae
                Tribe 2. Spirilleae
            Family V. Micrococcaceae
            Family VIII. Carynebacteriaceae
            Family IX. Achromobacteriaceae
            Family X. Enterobacteriaceae
                Tribe 3. Serrateae
            Family XII. Bacteriaceae
            Family XIII. Bacillaceae
    Order II. Actinomyetales
        Family I. Mycobacteriaceae
        Family II. Actinomycetaceae The various yeast families operable in the invention are listed below:

Members of order: Saccharomycetales
    Family 1. Endomycetaceae
    Family 2. Schizosaccharomycetaceae
    Family 3. Saccharomycetaceae
    Family 4. Torulopsidaceae
    Family 5. Rhodotorulaceae
    Family 6. *Candida lipolytica*

Tests were conducted utilizing two yeasts including *Candida pulcherrima* and *Candida lipolytica;* two Micrococcus species; two Pseudomonas; and two Nocardia. The *Candida pulcherrima* yeast species did not have the capacity to consume hydrocarbons and was ineffective. The Nocardia species are in the sub-class Eubacteria of the family Actinomycetaceae.

The cultures were grown in aqueous mineral media including 10 volume percent of Kansas City Refinery waxy raffinate. This oil is a liquid at fermentation temperature and contains 10–12 percent wax of a chain length in the range of $C_{20}$–$C_{30}$. After 48 hours the cultures were examined for growth and n-paraffin removal. The ability to consume n-paraffins was assayed semi-quantitatively by extracting the residual oil from the culture and analyzing it by gas-liquid chromatography. The Pseudomonas culture grew best on the oil and effected the most complete removal of n-paraffins. All of the cultures excepting *Candida pulcherrima* grew on the oil and reduced the n-paraffin content of the oil. The generation time or doubling time for the Pseudomonas cultures was in the range of 1.6 to 2.3 hours. The logarithmic phase of growth (protein synthesis) was established after 1–2 hours and continued for 5–6 hours.

In recovering the water phase containing the residual microorganisms, residual inseparable oil, and residual salt, the output from the fermenter was allowed to stand until the cell-oil layer separated out on top, when using yeast cells, and the lower aqueous phase containing about 1 to 2 percent of the cells was recovered as the normally-discarded phase and utilized in accordance with the invention. When utilizing the bacterial process, the fermentation process resulted in the formation of an extremely stable cell oil-water emulsion not separable by centrifugation. The fermentation effluent was solvent extracted by the following method. One volume of benzene was stirred into the fermenter output for 30 minutes and the resulting mixture was centrifuged and the liquid layers decanted into a separatory funnel. The upper or benzene layer was recovered and the benzene flashed off in a rotary vacuum evaporator to yield the extracted oil. The lower or aqueous layer, containing residual oil, salts, and bacteria, was recovered for use in the invention. The n-paraffins were converted to cells with approximately 144 percent yield which indicates that other hydrocarbons in addition to n-paraffins were consumed. Typical media composition for the yeast and bacteria cultures are given below:

For yeast:                              Grams per liter water
  $NH_4H_2PO_4$ ---------------------------- 2.5
  $Na_2HPO_4$ ------------------------------ 0.5
  $MgSO_4 \cdot 7H_2O$ --------------------- 0.5
  $KCl$ ------------------------------------ 0.5
  $FeSO_4 \cdot 7H_2O$ --------------------- 0.02
For bacteria:
  $KH_2PO_4$ ------------------------------- 1.0
  $K_2HPO_4$ ------------------------------- 2.0
  $NH_4Cl$ --------------------------------- 3.0
  $MgSO_4 \cdot 7H_2O$ --------------------- 0.4
  $FeSO_4 \cdot 7H_2O$ --------------------- 0.02

Minor concentrations of the above salts are present in the aqueous waste liquor.

To illustrate the effectiveness of the process utilizing waste fermentation product, tests were made utilizing a microcell packed with Burbank sand. The microcell consisted of a pair of standard microslides spaced 15 mils apart by Marlex (trademark of Phillips Petroleum Company designating polyolefins) spacers around the edges and sealed with epoxy resin. Hypodermic needles were inserted at each end of the microslide for injecting and withdrawing fluids. The pore volume of the sand-packed microslide was 0.5 cc. The sand was saturated with Burbank oil and then flooded with 3 cc. of Burbank formation water as a water flood step. Then 3 cc. of residual waste from an oil fermentation run was injected and after a waiting period of 48 hours at ambient temperature, 3 cc. of formation water were injected. An oil bank was found to build up in front of the final flood and the oil production was 50 percent or more of the residual oil in place after the first water flood which could not be produced by additional water flooding. The tests were made with both Pseudomonas bacteria and yeast (*Candida lipolytica*).

The amount of waste slug will vary from 0.01 to 0.5 pore volume of the stratum to be produced. Following the slug injection and a substantial growth period, brine or untreated surface water is injected behind the slug and this injection is continued until the oil-water ratio is so low as to be uneconomical to warrant continued injection. The salt in the injected water provides additional salt nutrient for the microorganisms.

Another embodiment of the invention comprises injecting a slug of water containing sufficient aqueous waste from an oil fermentation process to provide a 5–10 percent concentration of the waste liquid. In this procedure, there is no preliminary injection of the waste slug.

In another embodiment of the invention, stratum oil is recovered and admixed with a culture of microorganisms in saline aqueous solution for a period in the range of 5 to 48 hours or more and the resulting mixture containing microorganisms, surface active agents, and oil is injected as the slug followed by aqueous fluid drive or the resulting mixture is injected in admixture with the aqueous driving fluid as in the foregoing embodiment. A crude oil compatible with the crude to be produced may also be used in the above-ground fermentation step. The oil and aqueous saline medium (fermentation product) may be mixed in a wide range of proportions from about 5 to 95 percent oil. The aqueous saline medium is an inoculum nutrient substrate containing an actively growing culture of the desired microorganism(s) (prepared in conventional manner) which has undergone a growth period of at least 24 hours.

Certain modifications of the invention will become apparent to those skilled in the art and the illustrative details disclosed are not to be construed as imposing unnecessary limitations on the invention.

I claim:

1. A process for producing oil from an oil-bearing stratum comprising the steps of:
   (1) injecting into said stratum thru a well therein an aqueous slug of a by-product of an oil fermentation process containing oil, water, salts, and live cells of yeast, bacteria or mixtures thereof, said cells having the capacity to assimilate hydrocarbons during metabolistic action;
   (2) thereafter, injecting aqueous driving fluid thru said well into said stratum so as to drive the slug of step (1) and fermentation products thereof thru said stratum to a production well therein, displacing hydrocarbons from said stratum into said production well; and
   (3) recovering produced hydrocarbons from said production well.

2. The process of claim 1 wherein a substantial growth period is allowed between steps (1) and (2).

3. The process of claim 1 wherein said live cells comprise yeast.

4. The process of claim 1 wherein said live cells comprise non-pathogenic bacteria.

5. The process of claim 1 wherein said slug contains at least 0.05 gram (dry weight) of cells per liter of slug.

6. The process of claim 5 wherein said cells are yeast cells.

7. The process of claim 5 wherein said cells are non-pathogenic bacteria.

8. A process for producing oil from an oil-bearing stratum comprising the steps of:
   (1) mixing a portion of oil produced from said stratum with an aqueous culture of live cells of yeast, bacteria, or mixtures thereof which cells assimilate a portion of said oil during metabolistic action;
   (2) subjecting the mixture of step (1) to metabolistic action while agitating same, thereby increasing the concentration of live cells in the resulting cell-oil-water mixture;
   (3) injecting an aqueous slug of the resulting mixture of step (2) containing live cells in a concentration of at least 0.05 gram (based on dry weight) per liter thru a well into said stratum;
   (4) injecting aqueous driving fluid into said stratum thru said well to move said cells and fermentation products produced in situ thereby thru said stratum to a production well therein and displace oil into said production well; and
   (5) recovering the produced oil from said production well.

9. The process of claim 8 wherein a substantial growth period is allowed between steps (3) and (4) to increase the concentration of cells and the displacement of oil.

10. The process of claim 8 wherein the cells are yeast.

11. The process of claim 8 wherein the cells are non-pathogenic bacteria.

12. The process of claim 11 wherein said bacteria are Pseudomonas.

13. The process of claim 12 wherein surfactant is admixed with the slug injected in step (3) in a concentration of 0.05 to 1.0 weight percent of the slug.

14. The process of claim 8 wherein surfactant is admixed with the slug injected in step (3) in a concentration of 0.05 to 1.0 weight percent of the slug.

15. A process for producing oil from an oil-bearing stratum which comprises the steps of:
  (1) mixing with flood water a fermentation product prepared by mixing an inoculum nutrient substrate containing an actively growing culture of microorganisms of yeast, bacteria, or mixtures thereof which has undergone a growth period of at least 24 hours, with the selected crude oil in proportions in the range of 5 to 95 weight percent of oil and allowing fermentation to occur for a substantial period, said product being in the range of about 1 to 10 weight percent of said flood water;
  (2) injecting the mixture resulting from step (1) into said stratum thru a well therein;
  (3) continuing the injection of step (2) so as to drive oil into an offset production well; and
  (4) recovering the produced oil.

References Cited

UNITED STATES PATENTS

| | | |
|---|---|---|
| 2,660,550 | 11/1953 | Updegraff et al. |
| 2,907,389 | 10/1959 | Hitzman _____ 166—45 X |
| 3,032,472 | 5/1962 | Hitzman _____ 166—9 X |

FOREIGN PATENTS

| | | |
|---|---|---|
| 571,888 | 3/1959 | Canada. |

CHARLES E. O'CONNELL, *Primary Examiner.*
STEPHEN J. NOVOSAD, *Examiner.*